US006507717B2

(12) United States Patent
Kushida

(10) Patent No.: US 6,507,717 B2
(45) Date of Patent: Jan. 14, 2003

(54) FILTER UNIT WITH A RIB DISPOSED IN A FILTER RECESS

(75) Inventor: Hideki Kushida, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/817,126

(22) Filed: Mar. 27, 2001

(65) Prior Publication Data

US 2001/0026703 A1 Oct. 4, 2001

(30) Foreign Application Priority Data

Mar. 28, 2000 (JP) ....................................... 2000-088163

(51) Int. Cl.[7] ........................ G03G 21/20; B01D 39/08; B01D 46/52

(52) U.S. Cl. ............................ 399/93; 55/497; 55/500; 399/92

(58) Field of Search ............................ 399/91, 92, 93, 399/98; 55/490, 495, 497, 499, 500

(56) References Cited

U.S. PATENT DOCUMENTS

| | | | | |
|---|---|---|---|---|
| 4,135,900 A | * | 1/1979 | Westin et al. | 55/499 |
| 4,693,588 A | * | 9/1987 | Yarbrough et al. | 399/93 |
| 5,023,654 A | * | 6/1991 | Matsumoto et al. | 399/93 X |
| 5,618,324 A | * | 4/1997 | Sommer et al. | 55/497 |
| 5,792,228 A | * | 8/1998 | Fath et al. | 55/497 |
| 5,792,229 A | * | 8/1998 | Sassa et al. | 55/497 |
| 5,819,137 A | * | 10/1998 | Hoffman et al. | 399/93 |
| 5,989,303 A | * | 11/1999 | Hodge | 55/497 X |
| 6,126,707 A | * | 10/2000 | Pitzen | 55/495 |

FOREIGN PATENT DOCUMENTS

EP 867216 A1 * 9/1998

* cited by examiner

*Primary Examiner*—Sandra Brase
(74) *Attorney, Agent, or Firm*—Fitzpatrick, Cella, Harper & Scinto

(57) ABSTRACT

A filter unit includes a corrugated filter, and a casing for containing the filter. A reinforcement member is formed by casting a resin material into at least one recess of the filter.

8 Claims, 9 Drawing Sheets

FILTER UNIT WITH A RIB DISPOSED IN A FILTER RECESS

BACKGROUND OF THE INVENTION

1. Field of the Invention

This invention relates to a filter unit for an image forming apparatus such as a photocopier, a printer and the like.

2. Description of Related Art

An intake and an exhaustion of internal and external air stream are performed by an image forming apparatus such as a photocopier of an electro-photographic type, a printer, a facsimile machine for a purpose of thermal fixation of an image and also for a purpose of cooling. An exhaust opening and an intake opening of most image forming apparatuses are prepared with an electrostatic filter for dust prevention.

A conventional structure of the electrostatic filter will hereinafter be described with reference to FIG. 7 through FIG. 9. FIG. 7 shows a conventional electrostatic filter unit, FIG. 8 shows a conventional electrostatic filter, and FIG. 9 shows a filter casing.

An electrostatic filter unit 100 shown in FIG. 7 is prepared to an air duct 102 formed with an electric power cord 105 and a blower 101, e.g., a fan in which the air duct 102 guides air created by the blower 101 to a targeted member subject to internal blowing. In means to prevent dust or the like from entering the targeted member subject to internal blowing, an electrostatic filter 103 is contained within a filter casing 106 and is engaged to either the blower 101 or the air duct 102. An upper lid 104 having plural ventilation openings and serving as a safety member for preventing the user from directly touching the blower 101 is engaged to the blower 101 or the air duct 102 on a downstream side of the electrostatic filter 103. Synchronizing with the operation of an apparatus body, when power is supplied via the electric power cord 105, the blower 101 rotates and the, in the direction illustrated in arrow A, air from outside containing dust or the like enters an intake opening and passes through the electrostatic filter 103 and then enters the air duct 102 and continues to enter the inside of the image forming apparatus.

As shown in FIG. 8, the electrostatic filter 103 is formed in a corrugated shape for effective dust removal and pressure loss reduction, and for the purpose of maintaining thus corrugated shape, an edge portion of creasings of the filter is secured by a fixing means such as a hot-melt type adhesive 107.

Nevertheless, due to a manufacturing problem of the hot-melt type adhesive 107 and also due to a heating problem caused from a processing of the hot-melt type adhesive 107, the structure in which the hot-melt type adhesive 107 securing the edge portion of the creasings of the electrostatic filter creates extreme difficulty in a case such as achieving a precise measurement. Accordingly, the structure raises a problem of requiring a large number of processing steps. Furthermore, the electrostatic filter 103 tends to deform extremely easily and is difficult to be solely used regardless of the fact that both sides of the electrostatic filter 103 are secured by the hot-melt type adhesive 107; therefore, in order to actually use the electrostatic filter 103, the electrostatic filter 103 requires to be contained in a filter casing 106 shown in FIG. 9 or a casing of the like and also requires much labor in a manufacturing process.

Thus conventional structure required the upper lid 104 at a downstream portion of the electrostatic filter 103 for a safety measure in which the upper lid 104 is provided with a louver or louvers serving as ventilation openings; further, with thus conventional structure a space inside the image forming apparatus would become necessary and also the processing steps for maintenance would increase in correspondence with the increase in the number of components. Many image forming apparatuses such as photocopiers, facsimiles, or printers are structured in a manner where a fan motor and the like could easily be touched during use or during maintenance; therefore, a prevention of thus touching of the fan motor and the like would be necessary.

SUMMARY OF THE INVENTION

The object of this invention is to provide a filter unit to be easily manufactured with high component precision. Another object of this invention is to provide a highly durable filter unit. Another object of this invention is to provide a filter unit having: a corrugated filter; a casing for containing the filter; and a reinforcement member formed by casting a resin material into one recess of the filter at least. A further object of this invention will be described hereinafter.

BRIEF DESCRIPTION OF THE DRAWINGS

The above and other objects and features of the invention are apparent to those skilled in the art from the following preferred embodiments thereof when considered in conjunction with the accompanied drawings, in which.

DESCRIPTION OF THE PREFERRED EMBODIMENTS

Figure 1:
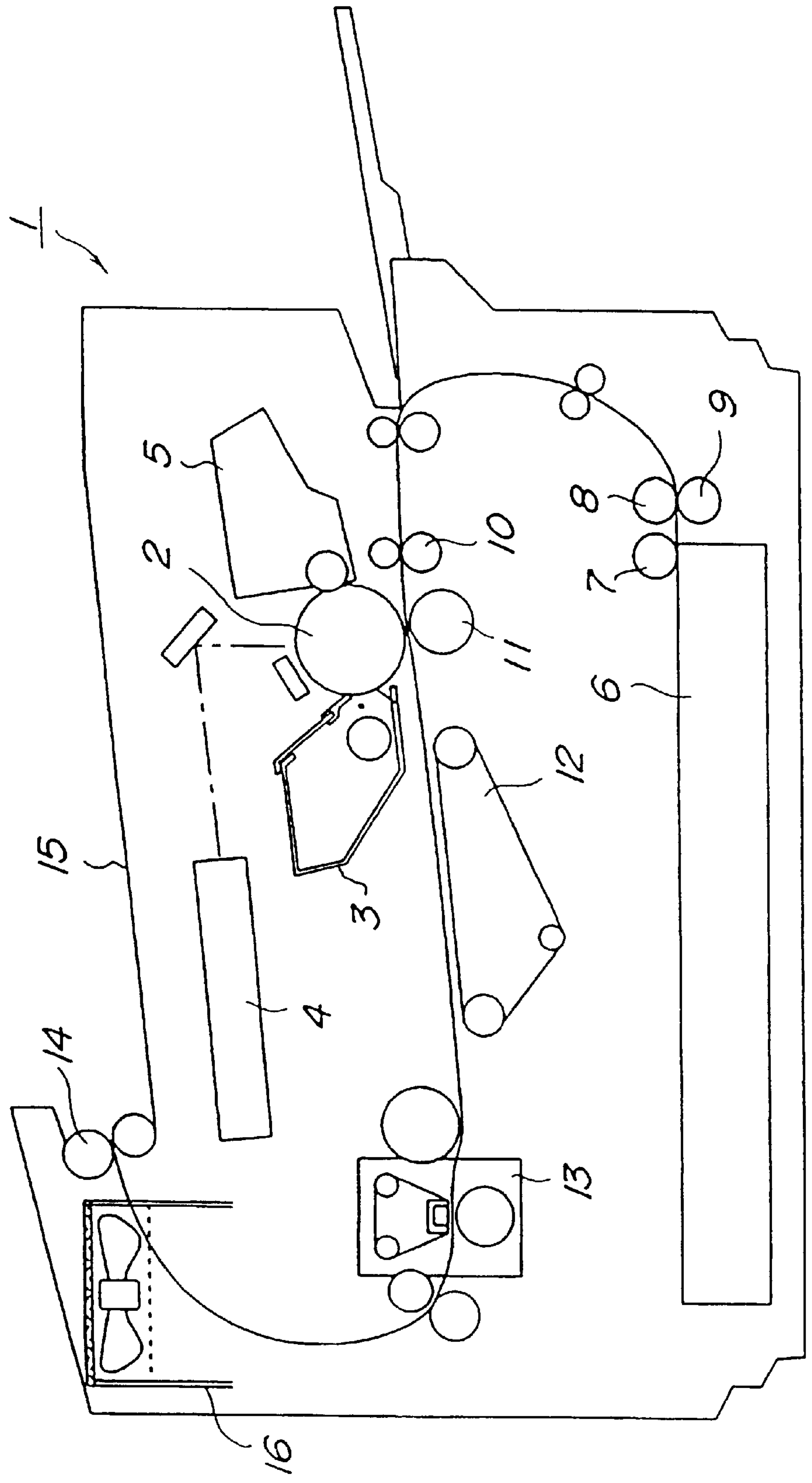
FIG. 1 is an entire structural view of an image forming apparatus according to the first embodiment.
Figure 2:
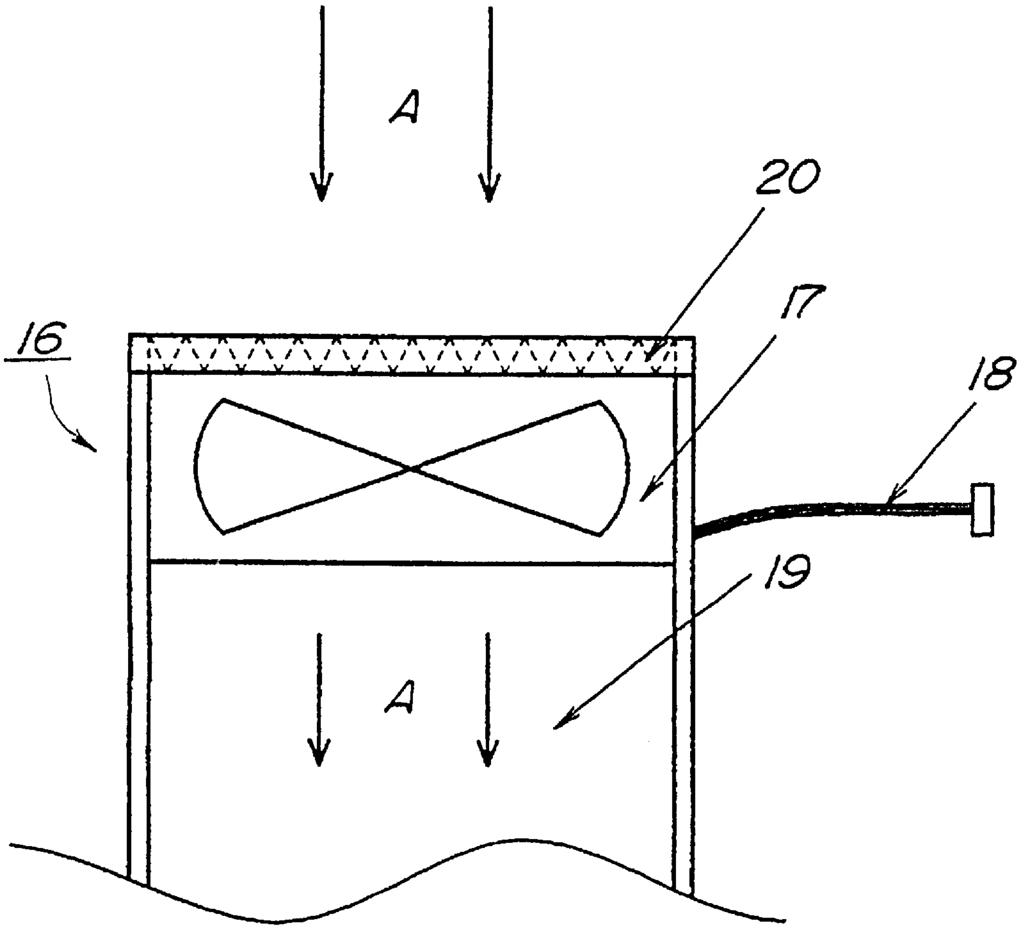
FIG. 2 is a descriptive view showing an electrostatic filter unit according to the first embodiment.
Figure 3:
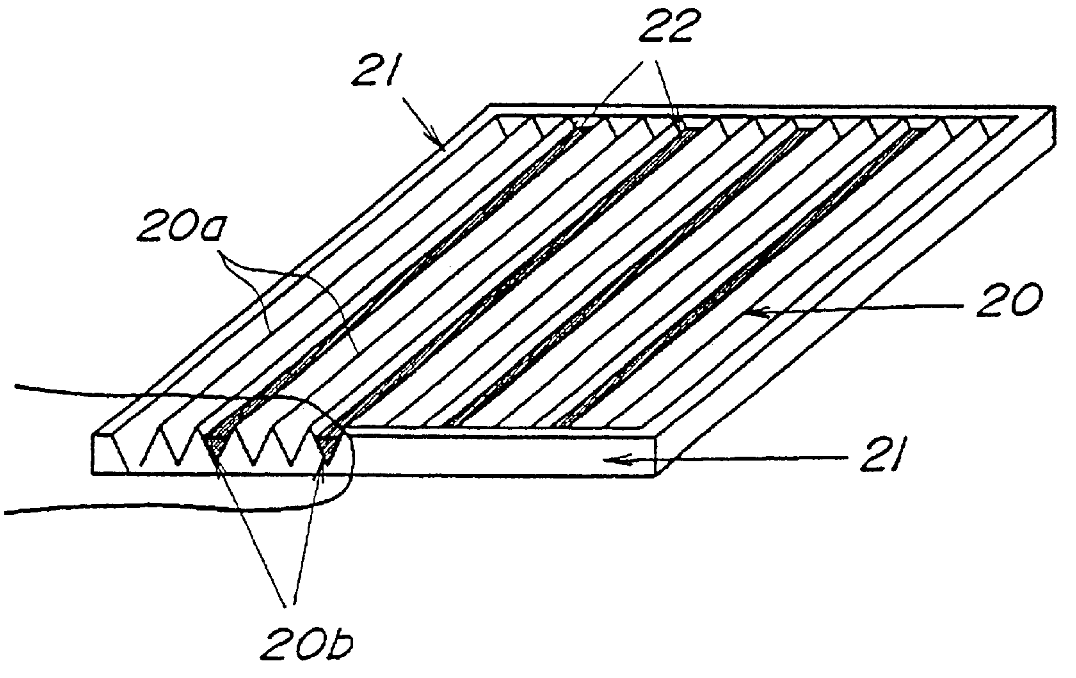
FIG. 3 is a descriptive view showing an electrostatic filter.
Figure 4:
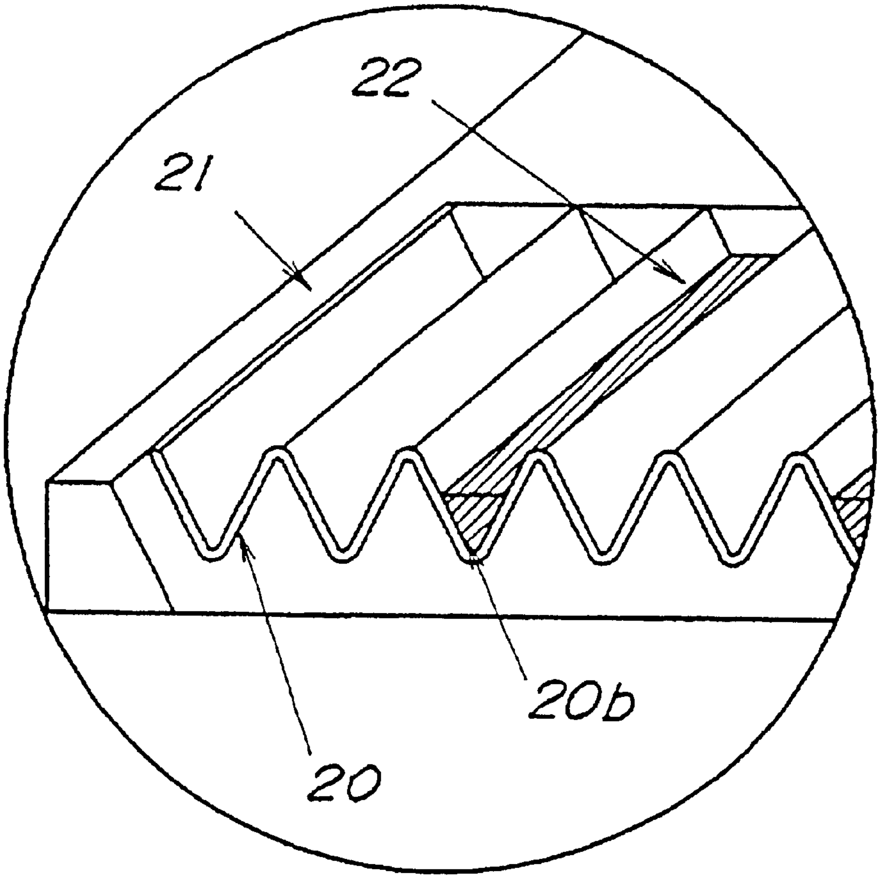
FIG. 4 is an enlarged view showing a portion of an electrostatic filter.

A first embodiment of an electrostatic filter unit and an image forming apparatus regarding this invention will hereinafter be described with reference to the drawings. FIG. 1 is a an entire structural view of an image forming apparatus; FIG. 2 is a descriptive view showing an electrostatic filter unit; FIG. 3 is a descriptive view showing an electrostatic filter; and FIG. 4 is an enlarged view showing a portion of an electrostatic filter.

An image forming apparatus 1 shown in FIG. 1 is an electro photographic type in which a primary charging means 3 uniformly charges onto a photosensitive drum 2 serving as an image carrier, and then an optical means 4 forms an electrostatic latent image by scanning with a laser, and then thus electrostatic latent image is visualized by a developing means 5, and then a toner image is formed. Provided at a lower portion of the image forming apparatus is a sheet feeding cassette 6 for piling and containing a sheet serving as a recording medium, and then a feed roller 8 and a retard roller 9 would separate and deliver one sheet at time after a top most placed sheet is drawn out from a pickup roller 7, and then a pair of slant correcting resister rollers 10 conveys simultaneously with the photosensitive drum 2.

The toner image on the photosensitive drum 2 is transferred to a sheet by a transferring means 11, and then a conveying means 12 conveys the toner image to a fixing means 13. The fixing means 13 having a heater 13*a* fixes the toner image to a sheet by applying heat and pressure, and then a pair of discharging rollers 14 discharges and piles the sheet to a discharge tray 15 arranged on an upper portion of the image forming apparatus.

An electrostatic filter unit 16, which sucks in external air for a cooling purpose, is prepared inside the image forming apparatus 1. As shown in FIG. 2, the electrostatic filter unit 16 is prepared to an air duct 19 formed with an electric power cord 18 and a blower 17, e.g., a fan in which the air duct 19 guides air created by the blower 101 to a targeted member subject to internal blowing. In means to prevent dust or like from entering the targeted member subject to internal blowing, an electrostatic filter 20 is contained within a filter casing 21 and is engaged to either the blower 17 or the air duct 19. The electrostatic filter 20 is arranged in a manner exposed to an outer covering of the image forming apparatus, and thus serves as an upper lid of the air duct 19.

Synchronizing with an operation of a main body, when an electric source is supplied via the electric power cord 18, the blower 17 rotates, and then, in the direction illustrated in arrow A, air from outside comprised of dust or the like enters an intake opening and passes through the electrostatic filter 20 and then enters the air duct 19 and continues to enter the inside of the image forming apparatus.

As shown in FIG. 3, the electrostatic filter 20 is formed in a corrugated shape having plural projections and recesses in which the electrostatic filter 20 is comprised of a projection 20*a* and a recess 20*b* and is also formed of an unwoven fabric with polypropylene resin as a main constituent. The electrostatic filter 20 is contained inside filter casing 21 to form a united body and thus a resin material is casted and bonded to plural adequately spaced portions of the recess 20*b* having a triangular cross-sectional rib 22 as shown in FIG. 4. Accordingly, the corrugated shape of the electrostatic filter 20 could be maintained and thus a durability of the filter casing 21 could be enhanced. In addition, the rib 22 could be arranged either on the front side or the backside of the electrostatic filter 20; on the other hand, the rib 22 could be arranged on both sides as well.

The molding of the rib 22 by casting the resin material into the recess 20*b* of the electrostatic filter 20 enables a forming of a united body comprising the electrostatic filter 20, the filter casing 21 and the casing-reinforcing rib 22, and further, the structure of the electrostatic filter unit 16 could be strengthened. Therefore, in accordance with this embodiment, the electrostatic filter 20 could serve as an upper lid intended for safety.

Second Embodiment

Figure 5:
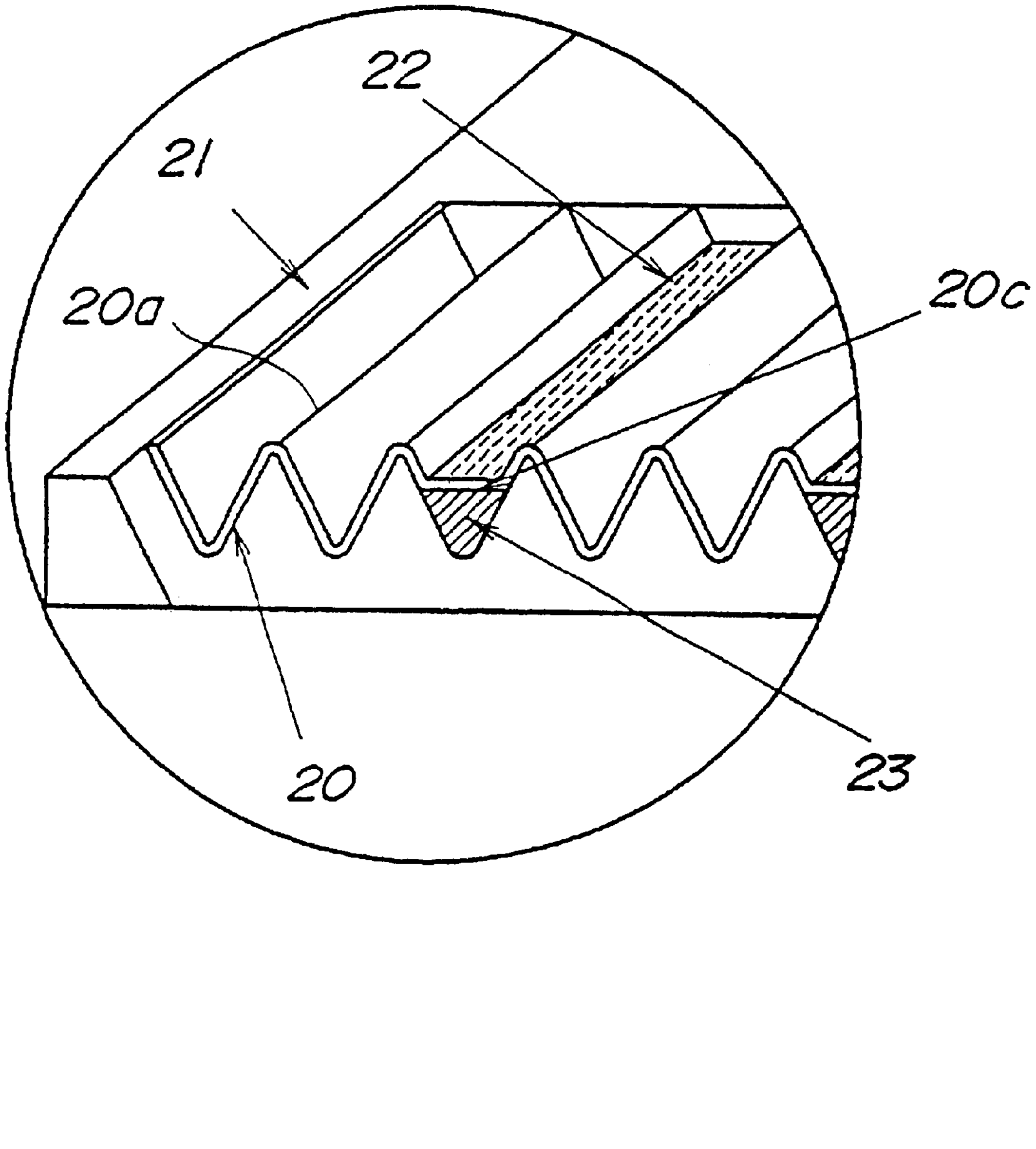
FIG. 5 is an enlarged view showing a portion of an electrostatic filter according to the second embodiment.

A second embodiment of an electrostatic filter unit and an image forming apparatus regarding this invention will hereinafter be described with reference to the drawings. FIG. 5 is an enlarged view showing a portion of an electrostatic filter; in addition, the description regarding the portions overlapping with that of the first embodiment shall be omitted by using the same symbols as the first embodiment.

Although the rib 24 shown in the first embodiment is molded by casting a resin material into a recess 20*b* of the electrostatic filter 20, in this second embodiment, the corrugated recess 20*b* for forming the rib 24 is transformed and flattened into a transformed portion 20*c* shown in FIG. 5.

Accordingly, during a process where the filter casing 21 and the rib 24 are molded into a united body, the rib 24 would be molded by forming a resin material casting region 23 having a triangular cross-section between a molding frame and by casting a resin material into thus resin material casting region 23. Thus structured mass productivity of the electrostatic filter unit would improve and an inexpensive high-grade electrostatic filter unit could be provided. In addition, as mentioned in the first embodiment, the rib 24 could be arranged either on the front side or the backside of the electrostatic filter 20; on the other hand, the rib 24 could be arranged on both sides as well.

Third embodiment

Figure 6:
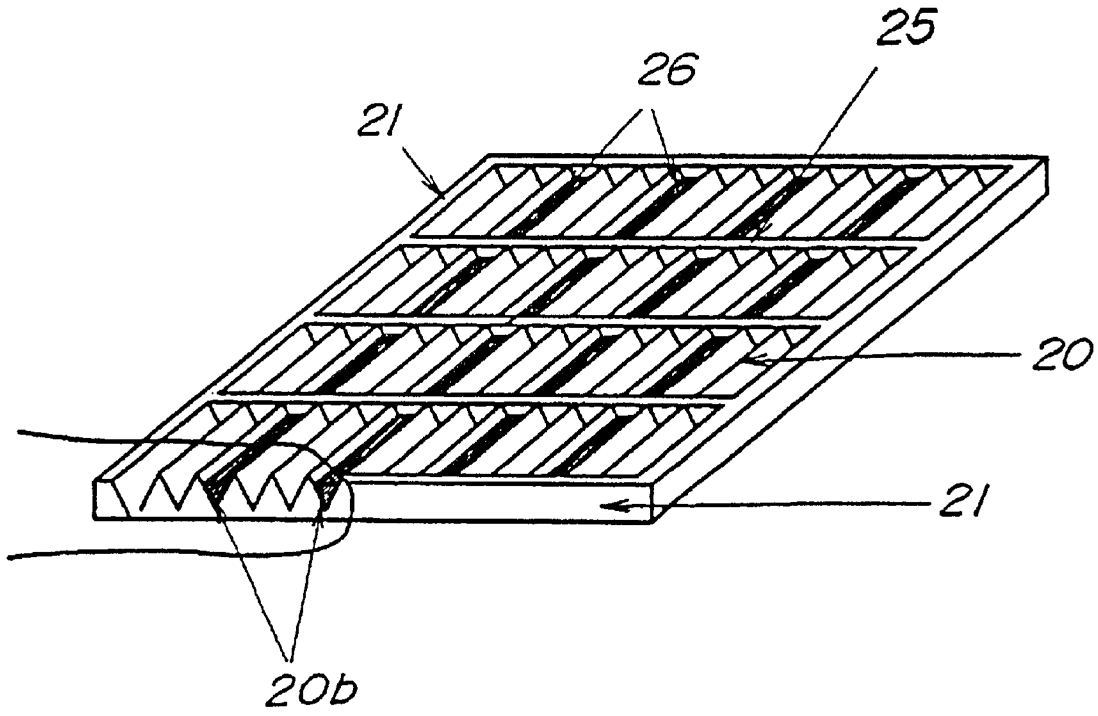
FIG. 6 is a descriptive view showing an electrostatic filter according to the third embodiment.
Figure 7:
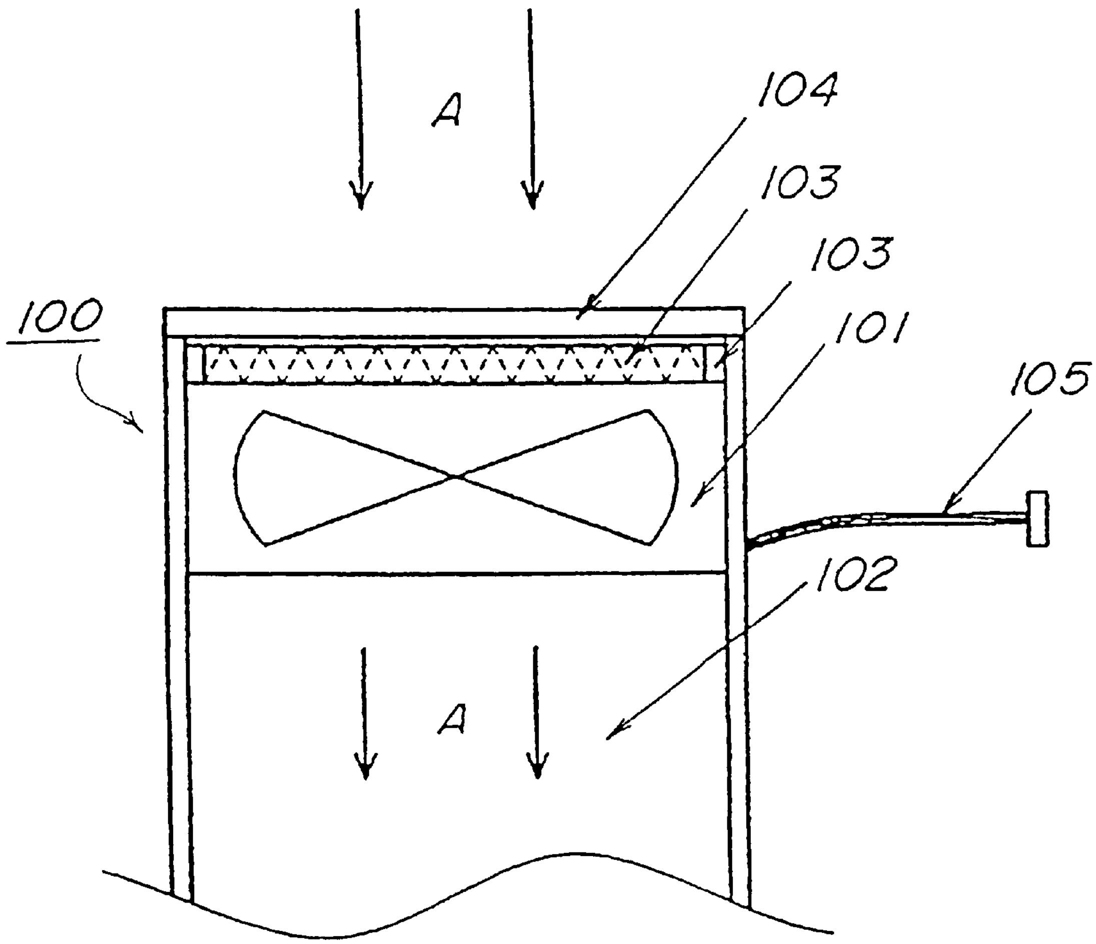
FIG.7 (PRIOR ART)
FIG. 7 is a descriptive view showing a conventional electrostatic filter unit.
Figure 8:
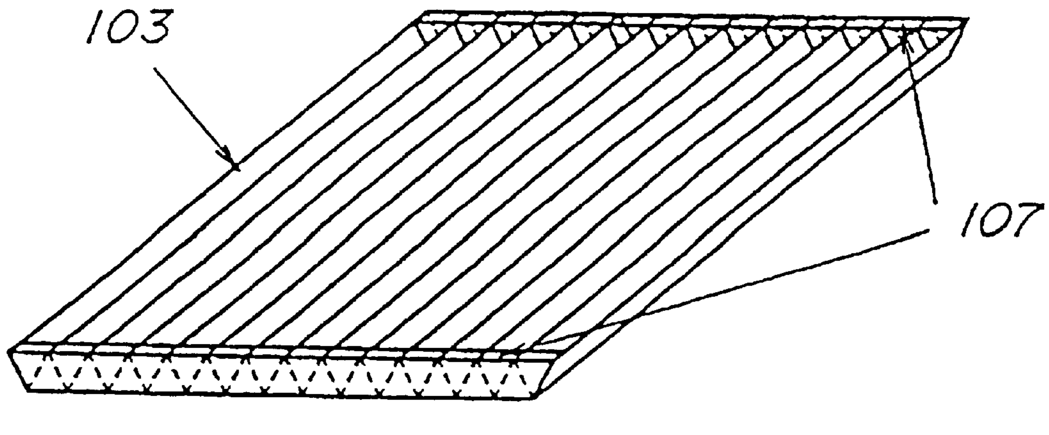
FIG.8 (PRIOR ART)
FIG. 8 is a descriptive view showing a conventional electrostatic filter.
Figure 9:
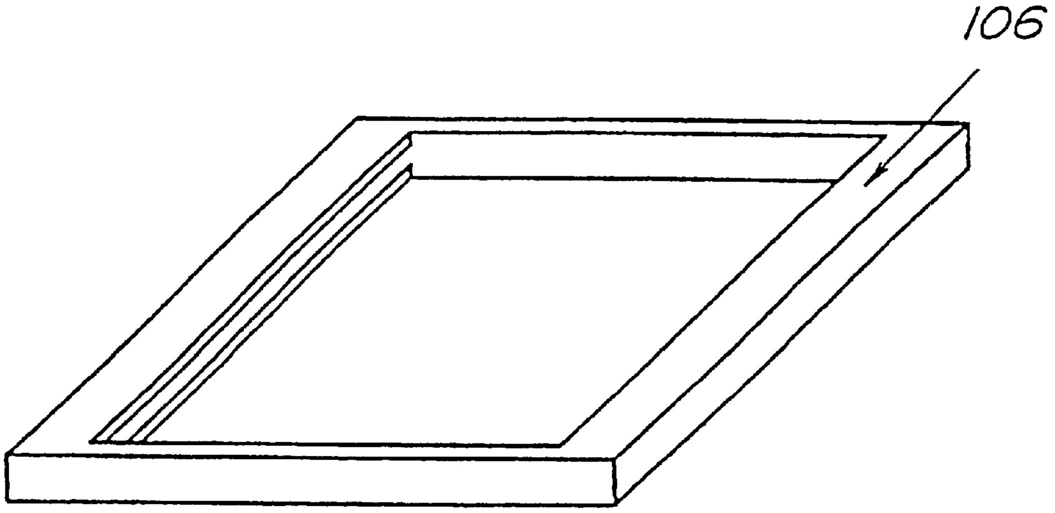
FIG.9 (PRIOR ART)
FIG. 9 is a descriptive view showing a conventional filter casing.

A third embodiment of an electrostatic filter unit and an image forming apparatus regarding this invention will hereinafter be described with reference to the drawings. FIG. 6 is a descriptive view showing an electrostatic filter; in addition, the description regarding the portions overlapping with that of the first embodiment shall be omitted by using the same symbols as the first embodiment.

Although the rib 22 of the first embodiment is formed only in a direction along the corrugated electrostatic filter 20 (See FIG. 3), in this third embodiment, a lattice like rib is formed. That is, as shown in FIG. 6, a longitudinal rib 25 is formed by casting a resin material perpendicularly to the corrugated electrostatic filter 20, and further, a latitudinal rib 26 is formed by casting a resin into the recess 20*b* in the same manner as the first embodiment. Accordingly, the longitudinal rib 25 and the latitudinal rib 26 would perpendicularly intersect with each other to form a lattice like structure.

Therefore, molding the electrostatic filter 20 and the casing-reinforcing ribs 25, 26 into a lattice like structure would make the filter unit more durable compared to that of the first embodiment, and thus would enable the maintaining the corrugated shape of the electrostatic filter 20 and also would make the electrostatic filter 20 serving as an upper lid more safer. Consequently, thus structure would be beneficial in a state where the electrostatic filter 20 is arranged in a manner exposed to an outer covering of the image forming apparatus while serving as an upper lid of the air duct 19 or an outer covering of the image forming apparatus.

As described above, in respect of the structure of an electrostatic filter unit and an image forming apparatus regarding this invention, a casing-reinforcing rib structured by casting a resin into a recess of a corrugated electrostatic filter would prevent the deforming of the corrugated filter and thus the filter, the filter casing and the casing-reinforcing rib could be molded into a united body, and further, the structure of the electrostatic filter would be strengthened.

Although, conventionally, the electrostatic filter, the filter casing and the upper lid of the air duct were required to be structured separately; the electrostatic filter unit and an image forming apparatus regarding this invention could mold the electrostatic filter, the filter casing and the upper lid of the air duct into a united body and thus would simplify the structure of the image forming apparatus. The thus structured electrostatic filter unit and an image forming apparatus regarding this invention is capable of preventing damage of the filter or slippage when thus apparatus is transported or dropped, and further, a manufacturing of a high performance and inexpensive apparatus would become possible.

In addition, the downsizing of thus apparatus would become possible since the upper lid would no longer be necessary; therefore, an efficient internal cooling performance could be provided without taking up much space. Furthermore, the reduction of components would contribute to the improvement of maintenance.

The mass productivity of the electrostatic filter unit would be improved and an inexpensive high-grade electrostatic filter unit could be provided by transforming the corrugated recess of the electrostatic filter into a flat portion, and by forming a rib at the resin material casting region having triangular cross-section in which the resin material casting region is formed between a molding frame.

Forming the rib into a lattice like structure would further strengthen the structure of the electrostatic filter in which a longitudinal rib is formed by casting a resin perpendicularly to the corrugated electrostatic filter and a latitudinal rib is formed by casting a resin in plural portions of the recess. Accordingly, thus structure would be effective in a state where the electrostatic filter is arranged in a manner exposed to an outer covering of the image forming apparatus while serving as an upper lid of the air duct or an outer covering of the image forming apparatus.

In conclusion, the embodiments of this invention is as described above, nevertheless, other variations within the technical idea of this invention shall be included in this invention and shall not be limited to the aforementioned embodiments.

What is claimed is:

1. A filter unit comprising:

a corrugated filter having a series of recesses;

a casing for containing the filter; and a reinforcement member formed by casting a resin material into a recess of the filter proximate to a center portion of the series of recesses, wherein the reinforcement member is filled from one end to the other end in a longitudinal direction of the recess.

2. A filter unit according to claim 1, wherein the casing and the filter are formed into a united body.

3. A filter unit according to claim 1, wherein the reinforcement member is in a rib shape.

4. A filter unit according to claim 1, wherein the filter unit includes a fan, and an air duct formed in air communication with the fan.

5. A filter unit according to claim 1, wherein the resin material is casted into a resin material casting region formed by transforming the recess of the filter.

6. A filter unit according to claim 1, wherein a rib is formed substantially perpendicular to the corrugated shape of the filter so as to form the rib into a lattice-like structure.

7. A filter unit according to claim 1, wherein the filter unit is arranged at an outer surrounding portion of an image forming apparatus.

8. A filter unit according to claim 7, wherein the image forming apparatus has a photosensitive member for carrying an electrostatic image.

* * * * *

UNITED STATES PATENT AND TRADEMARK OFFICE

CERTIFICATE OF CORRECTION

PATENT NO. : 6,507,717 B2 
DATED : January 14, 2003
INVENTOR(S) : Hideki Kushida It is certified that error appears in the above-identified patent and that said Letters Patent is hereby corrected as shown below:

Column 1,
Line 37, "the," should read -- them, --.
Line 66, "required" should read -- requires --.

Column 2,
Line 54, "a" should be deleted.

Signed and Sealed this

Twenty-third Day of September, 2003

JAMES E. ROGAN
*Director of the United States Patent and Trademark Office*